(12) United States Patent
Sakai

(10) Patent No.: US 10,947,911 B2
(45) Date of Patent: Mar. 16, 2021

(54) CONTROL SYSTEM OF INTERNAL COMBUSTION ENGINE

(71) Applicant: TOYOTA JIDOSHA KABUSHIKI KAISHA, Toyota (JP)

(72) Inventor: Hiroyuki Sakai, Yokohama (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 45 days.

(21) Appl. No.: 16/173,075

(22) Filed: Oct. 29, 2018

(65) Prior Publication Data

US 2019/0203651 A1 Jul. 4, 2019

(30) Foreign Application Priority Data

Dec. 28, 2017 (JP) ................................. 2017-253175

(51) Int. Cl.
*F02D 35/02* (2006.01)
*F02D 41/28* (2006.01)
(Continued)

(52) U.S. Cl.
CPC .......... *F02D 35/023* (2013.01); *F02B 19/108* (2013.01); *F02B 19/1085* (2013.01); *F02B 19/12* (2013.01); *F02B 19/18* (2013.01); *F02B 31/085* (2013.01); *F02D 35/027* (2013.01); *F02D 37/02* (2013.01); *F02D 41/28* (2013.01);
(Continued)

(58) Field of Classification Search
CPC .. F02D 35/023; F02B 31/085; F02B 19/1085; F02B 19/108; F02B 19/12; F02B 19/18; F02B 19/08
See application file for complete search history.

(56) References Cited

U.S. PATENT DOCUMENTS 8,925,518 B1* 1/2015 Riley ................... F02B 19/1057
123/261
9,593,633 B1* 3/2017 Kim ..................... F02D 41/1497
(Continued)

FOREIGN PATENT DOCUMENTS

JP 06-341320 12/1994
JP 07-004241 1/1995
(Continued)

*Primary Examiner* — Xiao En Mo
(74) *Attorney, Agent, or Firm* — Oblon, McClelland, Maier & Neustadt, L.L.P.

(57) ABSTRACT

An auxiliary chamber (51) having a spark plug (54) and an auxiliary fuel injector is formed at the central part of the top surface of the main combustion chamber (2). When making an air-fuel mixture in the auxiliary chamber (51) burn by the spark plug (54), an air-fuel mixture in the main combustion chamber (2) is made to burn by jet flames ejected from the communicating holes (52). The injection ports of the auxiliary fuel injector (53) are oriented toward a tumble flow inflow peripheral region (R) which is located on the peripheral part of the end portion of the auxiliary chamber (51) at a place located on a side where the tumble flow W flows in from the communicating holes (52). When the tumble flow (W) is made to be generated in the main combustion chamber (2) by the tumble flow control valve (48), auxiliary fuel (QF) is injected from the auxiliary fuel injector (53) toward the tumble flow inflow peripheral region (R) of the auxiliary chamber (51).

5 Claims, 12 Drawing Sheets

(51) Int. Cl.
  *F02P 5/152*    (2006.01)
  *F02B 31/08*    (2006.01)
  *F02B 19/10*    (2006.01)
  *F02M 57/06*    (2006.01)
  *F02D 37/02*    (2006.01)
  *F02B 19/12*    (2006.01)
  *F02B 19/18*    (2006.01)
  *F02B 19/08*    (2006.01)
  *F02M 61/14*    (2006.01)
  *F02P 5/153*    (2006.01)
  *F02D 41/30*    (2006.01)
  *F02D 41/00*    (2006.01)

(52) U.S. Cl.
  CPC ........... *F02M 57/06* (2013.01); *F02P 5/1522* (2013.01); *F02B 19/08* (2013.01); *F02D 41/3041* (2013.01); *F02D 41/3094* (2013.01); *F02D 2041/0015* (2013.01); *F02D 2200/0602* (2013.01); *F02M 61/14* (2013.01); *F02P 5/153* (2013.01)

(56) References Cited

U.S. PATENT DOCUMENTS

| | | | |
|---|---|---|---|
| 2014/0261298 A1* | 9/2014 | Sasidharan | F02B 19/1014 123/275 |
| 2015/0068489 A1* | 3/2015 | Bunce | F02B 19/108 123/262 |
| 2016/0298586 A1* | 10/2016 | Kimura | F02F 1/242 |
| 2016/0363041 A1* | 12/2016 | Moffat | F02B 19/1085 |
| 2017/0074224 A1* | 3/2017 | Ge | F02M 57/06 |
| 2017/0096932 A1* | 4/2017 | Chiera | F02P 13/00 |
| 2017/0122184 A1* | 5/2017 | Hampson | F02D 41/3005 |
| 2017/0167358 A1* | 6/2017 | Maier | F02B 19/18 |
| 2017/0284320 A1* | 10/2017 | Holst | F02B 19/1019 |
| 2017/0314456 A1* | 11/2017 | Blaxill | F02B 19/1014 |

FOREIGN PATENT DOCUMENTS

| | | |
|---|---|---|
| JP | 2007-192204 | 8/2007 |
| JP | 2017-129101 | 7/2017 |
| WO | WO 2017/075241 A1 | 5/2017 |

\* cited by examiner

CONTROL SYSTEM OF INTERNAL COMBUSTION ENGINE

TECHNICAL FIELD

The present invention relates to a control system of an internal combustion engine.

BACKGROUND ART

Known in the art is an internal combustion engine which includes the main combustion chamber, and the auxiliary chamber formed at the central portion of the top surface of the main combustion chamber and communicating with the inside of the main combustion chamber through the communicating holes. The auxiliary chamber has the spark plug and the auxiliary fuel injector, and a pressure adjusting means for adjusting the pressure in the auxiliary chamber is provided. (for example, see Japanese Unexamined Patent Publication No. 2007-205236). In this internal combustion engine, an air-fuel mixture in the auxiliary chamber is ignited by the spark plug to make jet flames be ejected from the communicating holes to the inside of the main combustion chamber and an air-fuel mixture in the main combustion chamber is made to burn by the jet flames. In this case, in this internal combustion engine, when the engine load is high, the air-fuel mixture sent from the main combustion chamber to the inside of the auxiliary chamber at the time of the compression stroke is ignited by the spark plug whereby the jet flames are produced, while when the engine load is low, auxiliary fuel for promoting combustion is injected from the auxiliary fuel injector into the air-fuel mixture sent from the main combustion chamber to the inside of the auxiliary chamber at the time of the compression stroke and the air-fuel mixture containing the auxiliary fuel is ignited by the spark plug to thereby produce the jet flames.

SUMMARY OF INVENTION

Technical Problem

In this regard, the auxiliary chamber usually has a plurality of communicating holes radially extending from the inside of the auxiliary chamber toward the peripheral part of the main combustion chamber so as to make the jet flames ejected from the auxiliary chamber uniformly disperse inside of the main combustion chamber. In this regard, however, when generating a tumble flow swirling about an axis perpendicular to the cylinder axis in the main combustion chamber by the supplied intake air, if the auxiliary chamber has a plurality of communicating holes radially extending from the inside of the auxiliary chamber toward the peripheral part of the main combustion chamber, the tumble flow will flow to the inside of the auxiliary chamber from the communicating holes positioned at the side where the tumble flow arrives.

If the tumble flow flows into the auxiliary chamber in this way, when the air-fuel mixture in the auxiliary chamber is ignited by the spark plug, the ignition flame will be pushed by the tumble flow and will not be able to spread to the peripheral part of the auxiliary chamber, which is located on a side into which the tumble flow flows. As a result, the jet flames ejected from the communicating holes into which the tumble flow flows will be weakened. If in this way the jet flames ejected from part of the communicating holes weaken, the air-fuel mixture positioned at the peripheral part of the main combustion chamber in the direction of advance of this weakened jet flames will be compressed by the rise in pressure due to the combustion of the surrounding air-fuel mixture and self ignite, thereby a problem occurs in that a knocking occurs. However, the above mentioned Japanese Unexamined Patent Publication does not consider at all the occurrence of knocking due to the tumble flow.

To solve the above problem, according to the present invention, there is provided a control device of an internal combustion engine comprising:

a main combustion chamber, and an auxiliary chamber formed at a central portion of a top surface of the main combustion chamber and communicating with the inside of the main combustion chamber through communicating holes, the auxiliary chamber having a spark plug and an auxiliary fuel injector, an air-fuel mixture in the main combustion chamber being burned by jet flames ejected from the communicating holes when making an air-fuel mixture in the auxiliary chamber burn by the spark plug, wherein the control device comprising a tumble flow control valve able to control a flow path of a flow of intake air in an intake port so as to cause the generation of a tumble flow swirling around an axis perpendicular to a cylinder axis in the main combustion chamber, the auxiliary chamber being provided with a plurality of the communicating holes radially extending from a peripheral part of an end portion of the auxiliary chamber, which end portion is located on the main combustion chamber side, toward the peripheral part of the main combustion chamber and opening inside a flow path of the tumble flow, injection ports of the auxiliary fuel injector are oriented toward a tumble flow inflow peripheral region which is located on the peripheral part of the end portion of the auxiliary chamber at a place located on a side where the tumble flow flows in from the communicating holes, and auxiliary fuel is injected from the auxiliary fuel injector toward the tumble flow inflow peripheral region of the auxiliary chamber when the tumble flow is made to be generated in the main combustion chamber by the tumble flow control valve.

Advantageous Effects of Invention

If auxiliary fuel is injected toward the tumble flow inflow peripheral region of the auxiliary chamber from the auxiliary fuel injector, the density of the air-fuel mixture around the tumble flow inflow peripheral region of the auxiliary chamber will become higher and a strong disturbance will be caused in the air-fuel mixture. Further, the tumble flow flowing in from the communicating holes will be slowed in speed, so the ignition flame generated by the spark plug will sufficiently spread to the tumble flow inflow peripheral region. As a result, the jet flames ejected from the communicating holes into which the tumble flow flows also will become more powerful in the same way as the jet flames ejected from the other communicating holes and thereby knocking can be kept from occurring.

BRIEF DESCRIPTION OF DRAWINGS

FIG. 7A is a view showing a normal state of propagation of flame inside an auxiliary chamber when no tumble flow is caused, while

FIG. 8A is a view showing an unpreferable state of propagation of flame inside an auxiliary chamber when a tumble flow is caused, while

FIG. 9A is an enlarged side cross-sectional view of the area around an auxiliary chamber, while

FIG. 10A is a view showing a preferable state of propagation of flame inside an auxiliary chamber when a tumble flow is caused, while

FIG. 12A is an enlarged side cross-sectional view of a modification of an auxiliary chamber, while

DESCRIPTION OF EMBODIMENTS

Figure 1:
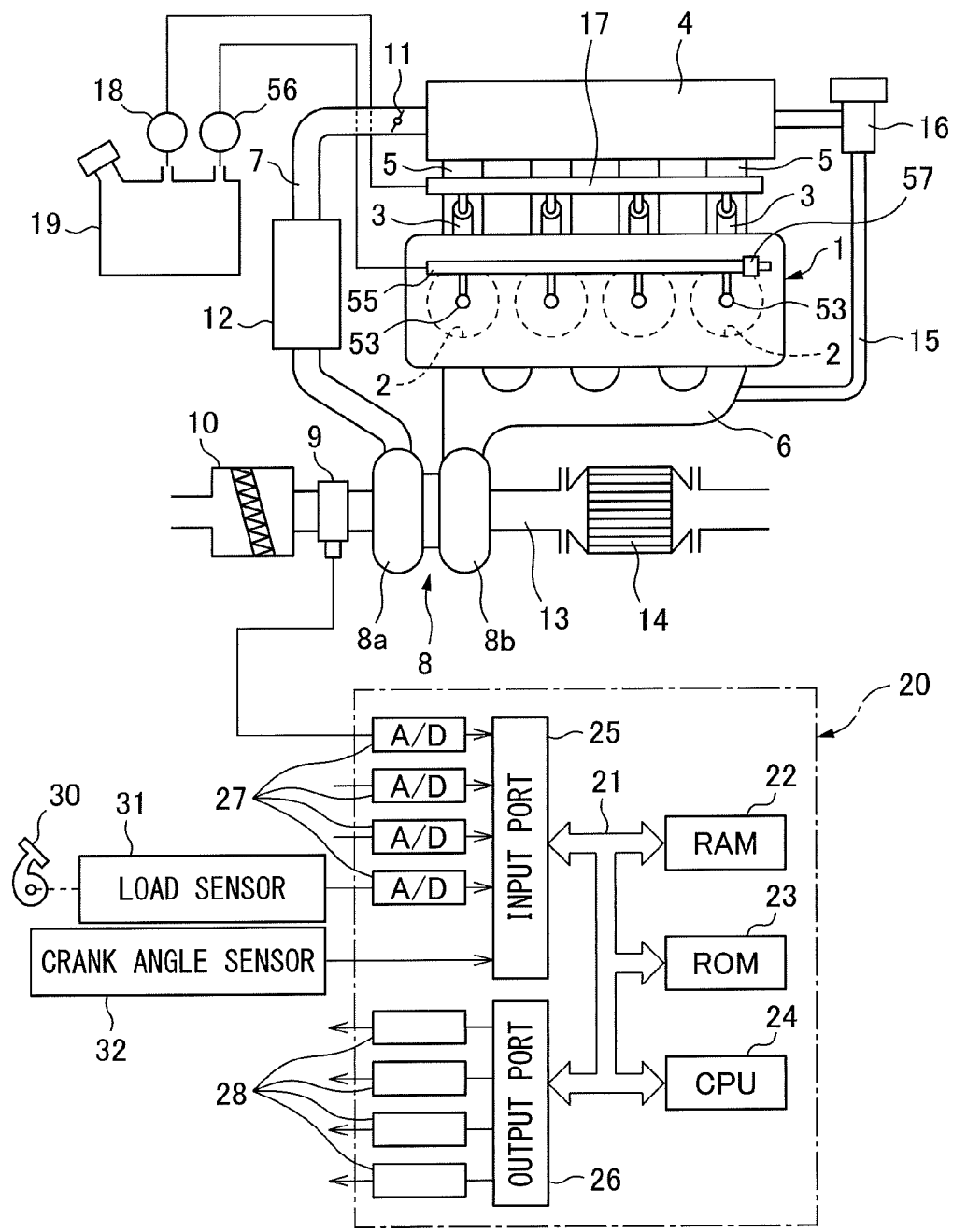
FIG. 1 is an overview of an internal combustion engine.

FIG. 1 shows an overview of an internal combustion engine fueled by gasoline. Referring to FIG. 1, 1 indicates an engine body, 2 a main combustion chamber of each cylinder, 3 a main fuel injector respectively provided for each cylinder, 4 a surge tank, 5 intake branch pipes, and 6 an exhaust manifold. The surge tank 4 is connected through an intake duct 7 to the outlet of a compressor 8a of an exhaust turbocharger 8. The inlet of the compressor 8a is connected through an intake air amount detector 9 to an air cleaner 10. Inside the intake duct 7, a throttle valve 11 driven by an actuator is arranged. Around the intake duct 7, an intercooler 12 for cooling the intake air flowing through the inside of the intake duct 7 is arranged.

On the other hand, the exhaust manifold 6 is connected to the inlet of an exhaust turbine 8b of the exhaust turbocharger 8, while the outlet of the exhaust turbine 8b is connected through an exhaust pipe 13 to an exhaust purification use catalytic converter 14. The exhaust manifold 5 and the surge tank 4 are connected with each other through an exhaust gas recirculation (below, referred to as "EGR") passage 15. Inside of the EGR passage 15, an EGR control valve 16 is arranged. Each main fuel injector 3 is connected to a fuel distributor 17. This fuel distributor 17 is connected through a fuel pump 18 to a fuel tank 19.

An electronic control unit 20 is comprised of a digital computer provided with a ROM (read only memory) 22, RAM (random access memory) 23, CPU (microprocessor) 24, input port 25, and output port 26 which are connected with each other by bidirectional bus 21. The output signal of the intake air amount detector 9 is input through a corresponding AD converter 27 to the input port 25. Further, an accelerator pedal 30 is connected to a load sensor 31 generating an output voltage proportional to the amount of depression of the accelerator pedal 30. The output voltage of the load sensor 31 is input through a corresponding AD converter 27 to the input port 25. Furthermore, the input port 25 is connected to a crank angle sensor 32 generating an output pulse each time a crankshaft rotates by for example 30°. On the other hand, the output port 26 is connected through corresponding drive circuits 28 to the main fuel injectors 3, the actuator for driving the throttle valve 11, the EGR control valve 16, and the fuel pump 18.

Figure 2:
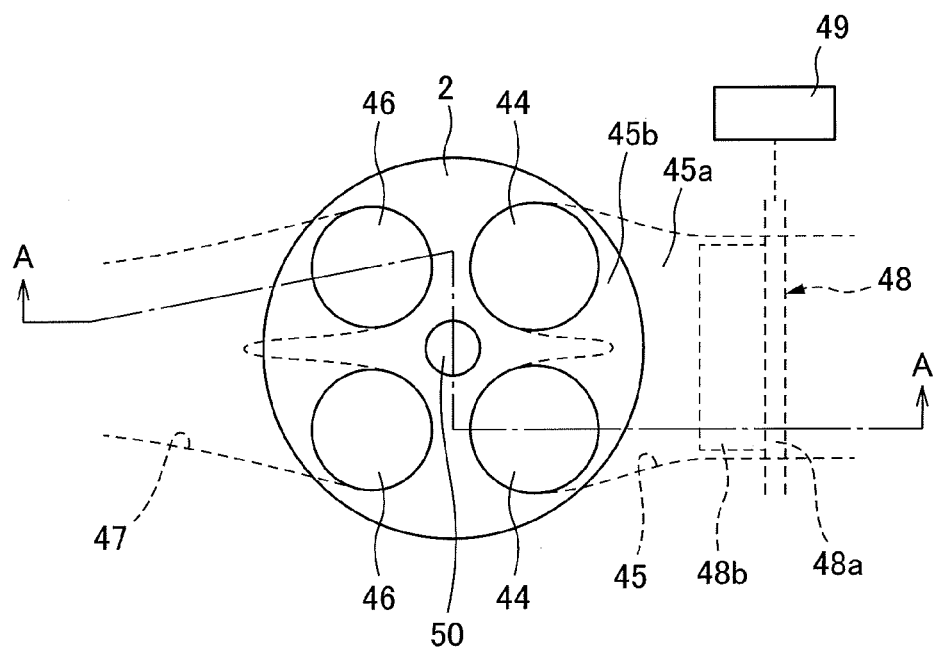
FIG. 2 is a view when looking at a cylinder head from below.
Figure 3:
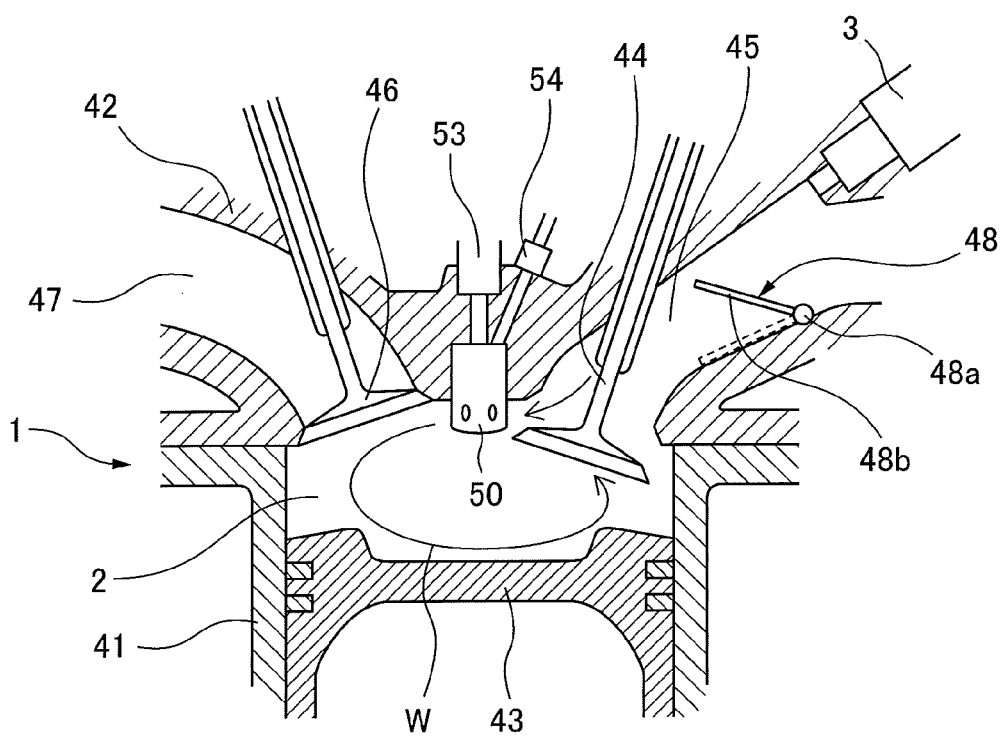
FIG. 3 is a side cross-sectional view of an internal combustion engine seen along the A-A cross-section of FIG. 2.

FIG. 3 is a cross-sectional view of the engine body 1 shown in FIG. 1, while FIG. 2 is a bottom view of the top surface of the combustion chamber 2 shown in FIG. 3. Note that, in FIG. 2 and FIG. 3, 41 indicates a cylinder block, 42 a cylinder head attached to the top of the cylinder block 41, 43 a piston reciprocally moving in the cylinder block 41, 44 a pair of intake valves, 45 an intake port, 46 a pair of exhaust valves, and 47 an exhaust port. As shown in FIG. 2 and FIG. 3, the intake port 45 extends in the cylinder head 42 so as to separate from the center axis of the cylinder as it separates from the main combustion chamber 2. In the example shown in FIG. 2 and FIG. 3, the intake port 45 is formed from a common passage part 45a for the pair of the intake valves 44 and branched passage parts 45b branching from this common passage part 45a toward the intake valves 44. A tumble flow control valve 48 is arranged in the common passage part 45a of the intake port 45.

As shown in FIG. 2 and FIG. 3, the tumble flow control valve 48 is comprised of a valve shaft 48a extending over the bottom wall surface of the intake port 45 in the longitudinal direction of the engine body 1 and a valve body 48b extending at a slant toward the top wall surface of the intake port 45 which is positioned at the downstream side of the valve shaft 48a when the tumble flow control valve 48 is closed. The tumble flow control valve 48 is controlled by an actuator 49 connected to the valve shaft 48a based on an output signal of the electronic control unit 20 to an open position shown by the broken line in FIG. 3 and a closed position shown by the solid line in FIG. 3. If the tumble flow control valve 48 is controlled to the closed position, the intake air flowing into the intake port 45 flows along the top wall surface of the intake port 45 and, as shown by the arrow W in FIG. 3, flows tangentially to the top surface of the main combustion chamber 2 whereby a tumble flow swirling about an axis perpendicular to the cylinder axis is generated in the main combustion chamber 2. In this way, in the embodiment of the present invention, the tumble flow W swirling about an axis perpendicular to the cylinder axis is made to be generated in the main combustion chamber 2 by the provision of the tumble flow control valve 48 able to control the flow path of the flow of intake air inside the intake port 45. Note that, as shown in FIG. 3, the main fuel injector 3 is arranged in the intake port 45 at the upstream side from the tumble flow control valve 48.

On the other hand, referring to FIG. 2 to FIG. 5, at a central part of the top surface of the main combustion chamber 2, an auxiliary chamber casing 50 is attached. In the example shown in FIG. 2 to FIG. 5, this auxiliary chamber casing 50 has a thin wall hollow cylindrical shape with two closed ends and is attached to the top surface of the main combustion chamber 2 so that the central axis of the auxiliary chamber casing 50 extends in the central axial direction of the cylinder. Further, in the example shown in FIG. 2 to FIG. 5, the upper portion of the auxiliary chamber casing 50 is positioned in the cylinder head 42, while only the lower portion of the auxiliary chamber casing 50 is exposed to the inside of the main combustion chamber 2. Inside this auxiliary chamber casing 50, an auxiliary chamber 51 is formed. The auxiliary chamber casing 50 is formed with a plurality of communicating holes 52 radially extending from the peripheral part of the end portion of the auxiliary chamber 51, which end portion is located on the main combustion chamber 2 side, toward the peripheral part of the main combustion chamber 2.

Figure 4:
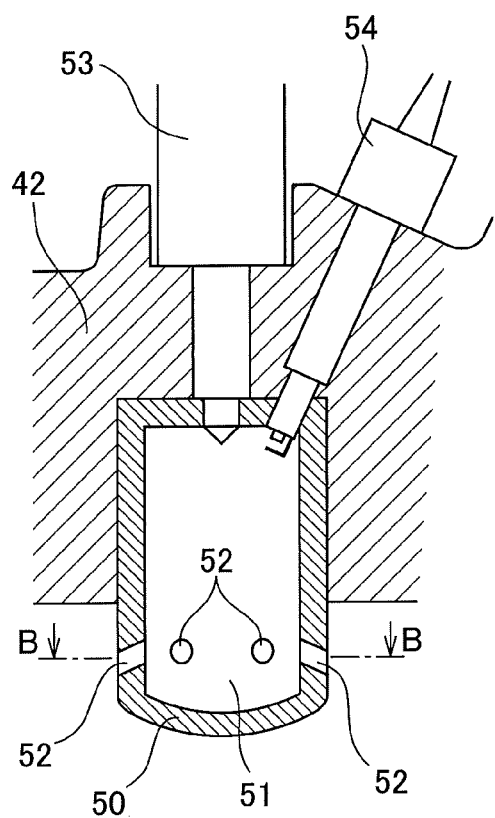
FIG. 4 is an enlarged side cross-sectional view of the area around an auxiliary chamber.
Figure 5:
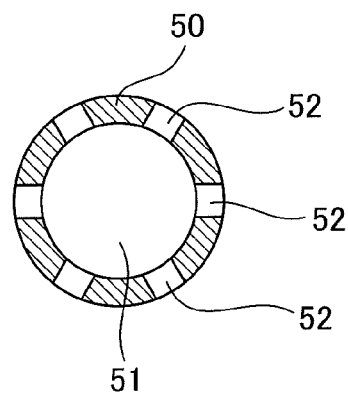
FIG. 5 is a cross-sectional view of an auxiliary chamber casing seen along the B-B cross-section of FIG. 4.

In this case, in the embodiment of the present invention, as shown in FIG. 5, the communicating holes 52 are formed at equal angular intervals about the center axis of the auxiliary chamber casing 50 so as to radially extend from the center axis of the auxiliary chamber casing 50. Further, in the embodiment of the present invention, as shown in FIG. 4, the communicating holes 52 extend somewhat downward toward the peripheral part of the main combustion chamber 2. As shown in FIG. 3, if the tumble flow W is generated in the main combustion chamber 2, this tumble flow W flows along the top surface of the main combustion chamber 2. Therefore, if the tumble flow W is generated in the main combustion chamber 2, the tumble flow W will flow around the lower portion of the auxiliary chamber casing 50 exposed to the inside of the main combustion chamber 2, that is, around the outer circumferential wall surface of the lower portion of the auxiliary chamber casing 50 where the communicating holes 52 open. Therefore, in the embodiment of the present invention, the auxiliary chamber 51 can be said to be provided with a plurality of communicating holes 52 radially extending from the peripheral part of the end portion of the auxiliary chamber 51, which end portion is located on the main combustion chamber 2 side, toward the peripheral part of the main combustion chamber 2 and opening in the flow path of the tumble flow W.

On the other hand, in the embodiment of the present invention, at the central part of the top surface of the auxiliary chamber 51, an auxiliary fuel injector 53 is arranged. Furthermore, at the peripheral part of the top surface of the auxiliary chamber 51, a spark plug 54 is arranged. The auxiliary fuel injector 53 of each cylinder, as shown in FIG. 1, is connected to a fuel distributor 55. This fuel distributor 55 is connected through a fuel pump 56 to the fuel tank 19. At this fuel distributor 55, a fuel pressure sensor 57 is attached for detecting a fuel pressure in the fuel distributor 55. An output signal of this fuel pressure sensor 57 is input through the corresponding AD converter 27 to the input port 25. Further, the auxiliary fuel injector 53 and the spark plug 54 of each cylinder are connected through the corresponding drive circuits 28 to the output port 26.

Figure 6:
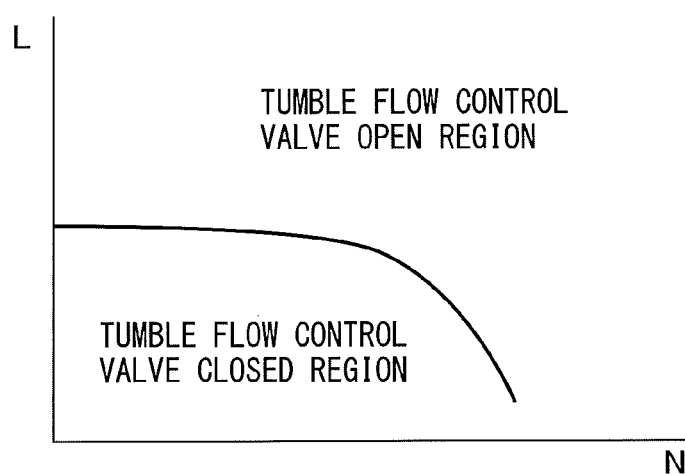
FIG. 6 is a view showing an open region and closed region of a tumble flow control valve.

FIG. 6 shows an open region where the tumble flow control valve 48 is made to open as shown by the broken line in FIG. 3 and a closed region where the tumble flow control valve 48 is made to close as shown by the solid line in FIG. 3. Note that, in FIG. 6, the ordinate L shows the engine load, while the abscissa N shows the engine speed. From FIG. 6, it will be understood that in the embodiment of the present invention, the tumble flow control valve 48 is made to open at the time of engine high load, high speed operation while the tumble flow control valve 48 is made to close at the time of engine low load low speed operation. Note that, in the embodiment of the present invention, at the time of engine high load, high speed operation where the tumble flow control valve 48 is made to open, the mean air-fuel ratio in the main combustion chamber 2 and in the auxiliary chamber 51 is made the stoichiometric air-fuel ratio or rich air-fuel ratio, while at the time of engine low load, low speed operation where the tumble flow control valve 48 is made to close, the mean air-fuel ratio in the main combustion chamber 2 and in the auxiliary chamber 51 is made the stoichiometric air-fuel ratio or lean air-fuel ratio.

Figure 7A:
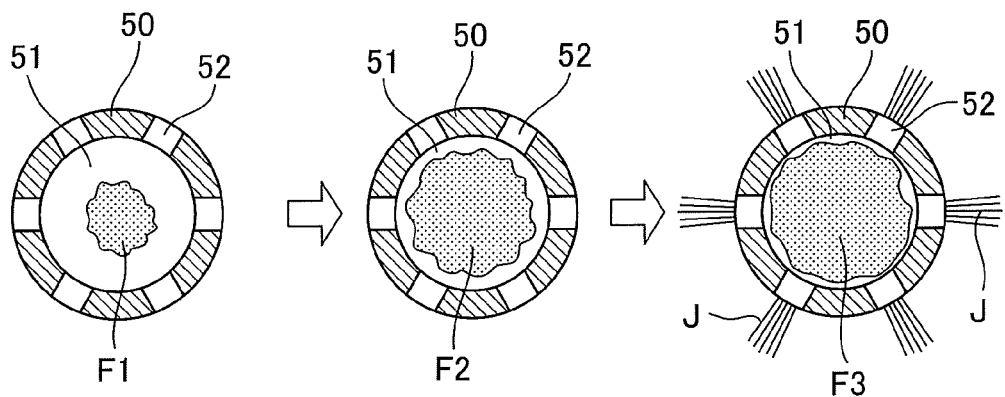
Figure 7B:
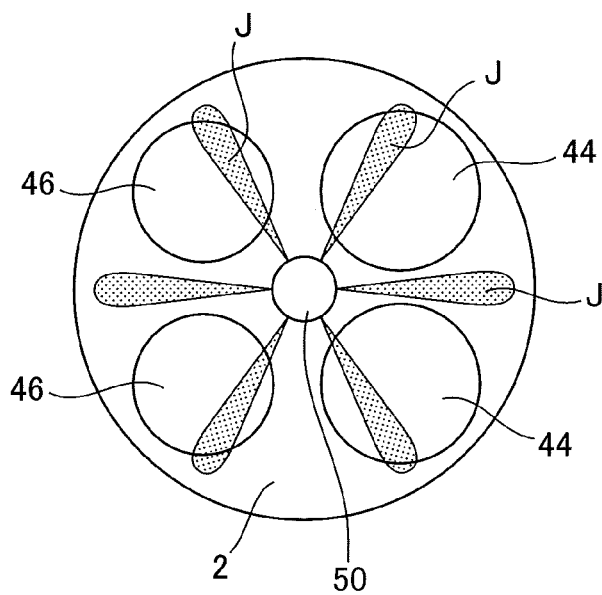
FIG. 7B is a view showing normal jet flames ejected from an auxiliary chamber when no tumble flow is caused.

In the internal combustion engine shown from FIG. 1 to FIG. 5, basically, the combustion in the auxiliary chamber 51 and in the main combustion chamber 2 is performed by injecting fuel from only the main fuel injector 3. FIG. 7A shows the state of propagation of the flame F in the auxiliary chamber 51 in the case where fuel is injected from only the main fuel injector 3 and no tumble flow W is made to be generated, while FIG. 7B shows jet flames J ejected from the auxiliary chamber 51 in the case where fuel is injected from only the main fuel injector 3 and no tumble flow W is made to be generated. That is, if the intake valve 44 is opened in the case where fuel is injected from only the main fuel injector 3 and no tumble flow W is made to be generated, the fuel injected from the main fuel injector 3 is supplied to the inside of the main combustion chamber 2 together with the intake air whereby an air-fuel mixture is formed in the main combustion chamber 2.

Next, if the compression stroke is started, the air-fuel mixture in the main combustion chamber 2 flows uniformly from all of the communicating holes 52 to the inside of the auxiliary chamber 51. Next, at the end phase of the compression stroke, an ignition action is performed by the spark plug 54 and the air-fuel mixture around the spark plug 54 is first ignited. Next, the ignition flame propagates inside of the auxiliary chamber 51 toward the main combustion chamber 2. As shown in FIG. 7A by F1, at the end portion of the auxiliary chamber 51, which end portion is located on the main combustion chamber 2 side where the communicating holes 52 are formed, the flame propagates to the central part inside of the auxiliary chamber 51. Next, as shown in FIG. 7A by F2 and F3, the flame uniformly propagates from the central part toward the peripheral part in the auxiliary chamber 51. As a result, jet flames J are ejected from the communicating holes 52 by a uniform intensity. Therefore, as shown in FIG. 7B, all of the jet flames J reach the peripheral part of the main combustion chamber 2.

The air-fuel mixture in the main combustion chamber 2 starts to be burned simultaneously due to these jet flames J. Therefore, the pressure uniformly increases in the entire region in the main combustion chamber 2. As a result, good combustion with no occurrence of knocking is obtained.

In this regard, however, if fuel is injected only from the main fuel injector 3, a problem arises if the tumble flow W is generated. This will be explained with reference to FIG. 8A and FIG. 8B. Note that, FIG. 8A shows the state of propagation of a flame F in the auxiliary chamber 51 when the tumble flow W is made to be generated in the case where fuel is injected only from the main fuel injector 3, while FIG. 8B shows the jet flames J ejected from the auxiliary chamber 51 when the tumble flow W is made to be generated in the case where fuel is injected only from the main fuel injector 3.

If the tumble flow W is made to be generated, as explained above, the tumble flow W flows around the lower portion of the auxiliary chamber casing 50 exposed to the inside of the main combustion chamber 2, that is, the area around the outer peripheral wall surface of the lower portion of the auxiliary chamber casing 50 at which the communicating holes 52 are opened. As a result, as shown in FIG. 8A by the arrows W, the tumble flow W flows into the auxiliary chamber 51 from the communicating hole 52 opened on the outer peripheral wall surface of the auxiliary chamber casing 50 which the tumble flow W strikes. Next, the tumble flow W flows cutting across the inside of the auxiliary chamber 51, then the tumble flow W, as shown in FIG. 8A by the arrow W, flows out from the communicating hole 52 positioned at the opposite side to the communicating hole 52 into which the tumble flow W flows.

Figure 8A:
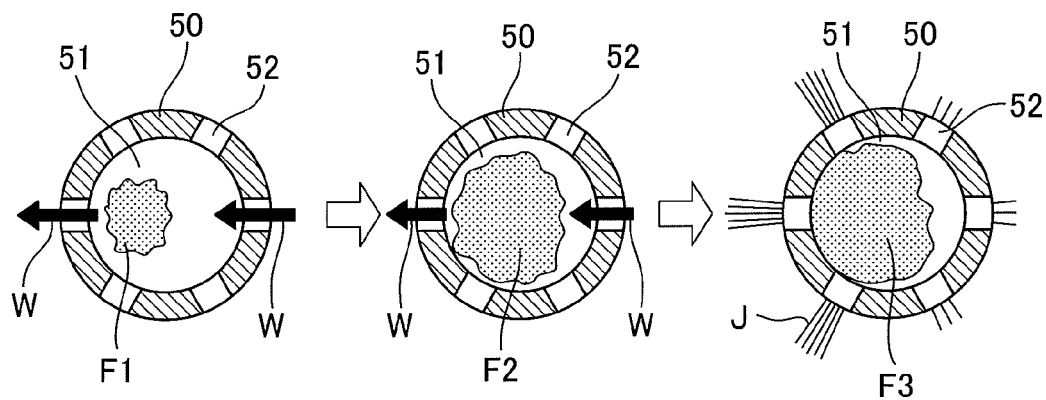
Figure 8B:
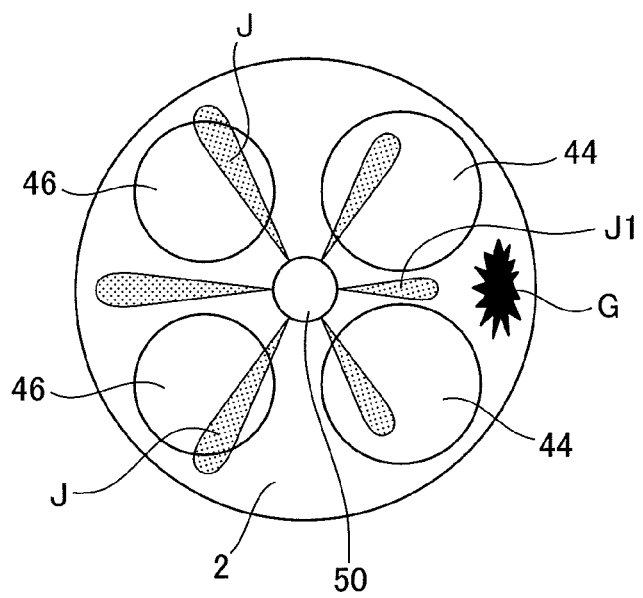
FIG. 8B is a view showing unpreferable jet flames ejected from an auxiliary chamber when a tumble flow is caused.

If the tumble flow W flows through the inside of the auxiliary chamber 51 in this way, the ignition flame of the air-fuel mixture ignited by the spark plug 54 grows in the state biased to the inside of the auxiliary chamber 51 at the side of the communicating hole 52 where the tumble flow W flows out, that is, to the inside of the auxiliary chamber 51 at the exhaust valve 46 side, as shown in FIG. 8A by F1, F2, and F3 due to the tumble flow W, and the growth of the ignition flame to the inside of the auxiliary chamber 51 at the communicating hole 52 side where the tumble flow W flows in, that is, to the inside of the auxiliary chamber 51 at the intake valve 44 side, is suppressed. As a result, as shown in FIG. 8B by J1, the jet flame ejected to the intake valve 44 side becomes weaker compared with other jet flames J and the jet flame J1 ejected to the intake valve 44 side no longer reaches the peripheral part of the main combustion chamber 2. If in this way part of the ejected jet flame J1 becomes weaker, the air-fuel mixture G positioned at the peripheral part of the main combustion chamber in the direction of progression of this jet flame J1 will be compressed due to the pressure rise due to combustion of the surrounding air-fuel mixture and will self ignite whereby knocking will occur.

Therefore, in the embodiment of the present invention, when the tumble flow W is made to be generated, to strengthen the jet flames ejected to the intake valve 44 side, fuel is also injected from the auxiliary fuel injector 53 in addition to the injection of fuel from the main fuel injector 3 whereby knocking is prevented from occurring. Next, this will be explained with reference to FIG. 9A to FIG. 11.

Figure 9A:
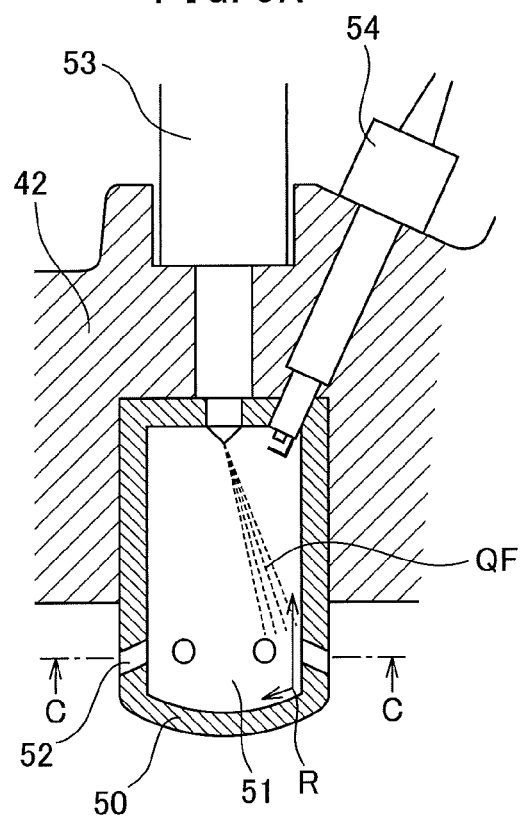
Figure 9B:
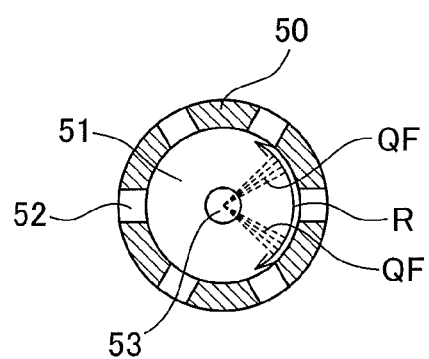
FIG. 9B is a cross-sectional view of an auxiliary chamber casing seen along the C-C cross-section of FIG. 9A.

That is, in the embodiment of the present invention, when the tumble flow W is made to be generated, as shown in FIG. 9A and FIG. 9B, the auxiliary fuel QF is injected from the auxiliary fuel injector 53 toward a tumble flow inflow peripheral region R which is located on the peripheral part of the end portion of the auxiliary chamber 50, which end portion is located on the main combustion chamber 2 side, at a place located on a side where the tumble flow W flows in from the communicating holes 52. That is, in the embodiment of the present invention, the injection ports of the auxiliary fuel injector 53 are oriented toward a tumble flow inflow peripheral region R which is located on the peripheral part of the end portion of the auxiliary chamber 50, which end portion is located on the main combustion chamber 2 side, at a place located on a side where the tumble flow W flows in from the communicating holes 52. Note that, regarding the range of this tumble flow inflow peripheral region R, the range in the center axis direction of the auxiliary chamber 51 is shown by the arrow R in FIG. 9A while the range in the circumferential direction of the auxiliary chamber 51 is shown by the arrow R in FIG. 9B.

Figure 11:
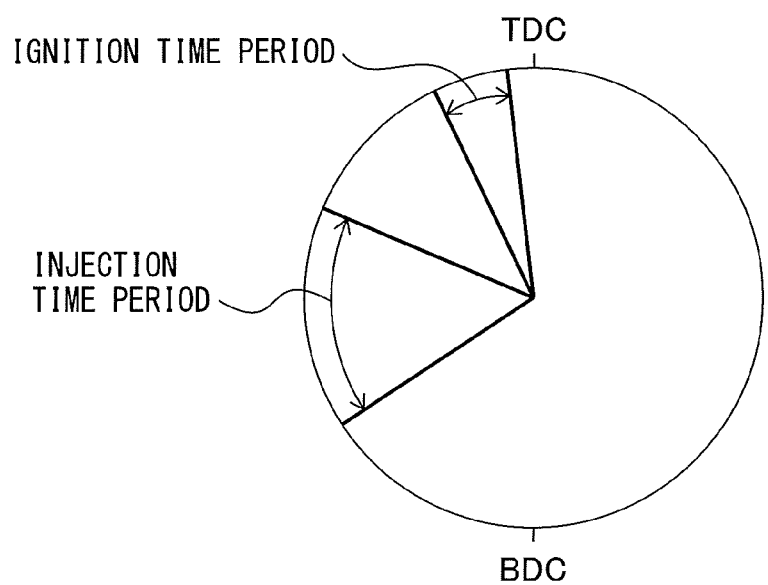
FIG. 11 is a view showing an injection timing of auxiliary fuel from an auxiliary fuel injector and ignition timing.

Note that, when the auxiliary fuel QF is injected from the auxiliary fuel injector 53, a bit after the auxiliary fuel QF is injected from the auxiliary fuel injector 53, the ignition action by the spark plug 54 is performed. In this case, the optimum range of injection timing of the auxiliary fuel QF from the auxiliary fuel injector 53 and the optimum range of ignition timing by the spark plug 54 are shown in FIG. 11.

Figure 10A:
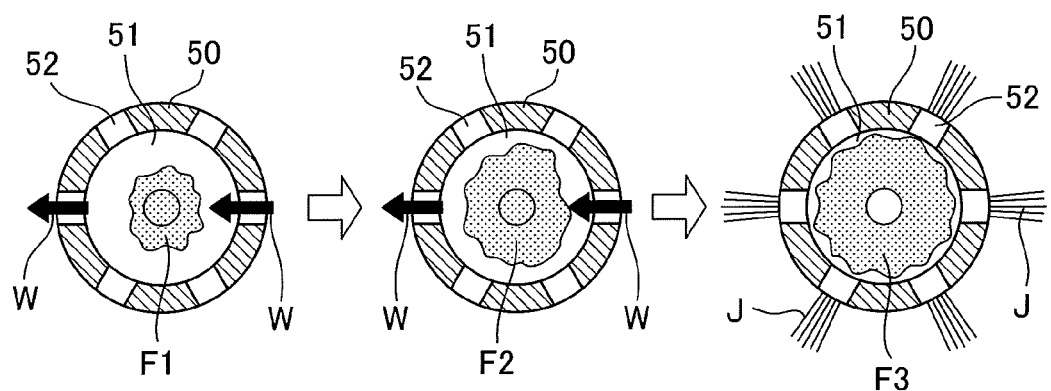

Now then, as shown in FIG. 9A and FIG. 9B, when the tumble flow W is made to be generated, if the auxiliary fuel QF is injected from the auxiliary fuel injector 53 toward the tumble flow inflow peripheral region R of the auxiliary chamber 51, the density of the air-fuel mixture around the tumble flow inflow peripheral region R of the auxiliary chamber 51 becomes higher and a strong disturbance is caused in the air-fuel mixture around the tumble flow inflow peripheral region R of the auxiliary chamber 51. Furthermore, due to fuel spray of the auxiliary fuel QF, the tumble flow W flowing in from the communicating holes 52 is decelerated. As a result, even if the tumble flow W flows to the inside of the auxiliary chamber 51, since the ignition flame due to the spark plug 54 propagates to the dense air-fuel mixture which is easily ignitable, as shown in FIG. 10A by F1, the ignition flame propagates to the central part in the auxiliary chamber 51 or to an area near the tumble flow inflow peripheral region R. Next, as shown in FIG. 10A by F2 and F3, the ignition flame uniformly propagates from the central part in the auxiliary chamber 51 or an area near the tumble flow inflow peripheral region R toward the peripheral part in the auxiliary chamber 51.

Figure 10B:
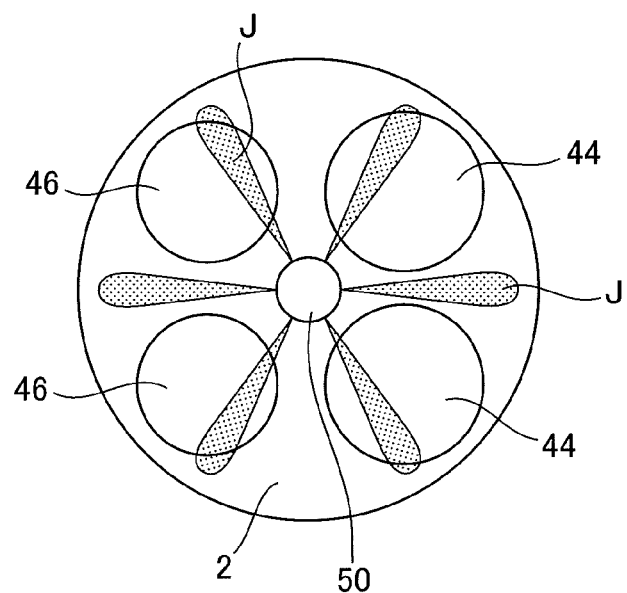
FIG. 10B is a view showing preferable jet flames ejected from an auxiliary chamber when a tumble flow is caused.

As a result, jet flames J are ejected from the communicating holes 52 by a uniform intensity. Therefore, as shown in FIG. 10B, all of the jet flames J reach the peripheral part of the main combustion chamber 2. Next, due to these jet flames J, the air-fuel mixture in the main combustion chamber 2 simultaneously starts to burn and the pressure uniformly increases in the entire region in the main combustion chamber 2. As a result, good combustion free of occurrence of knocking is obtained.

Figure 12A:
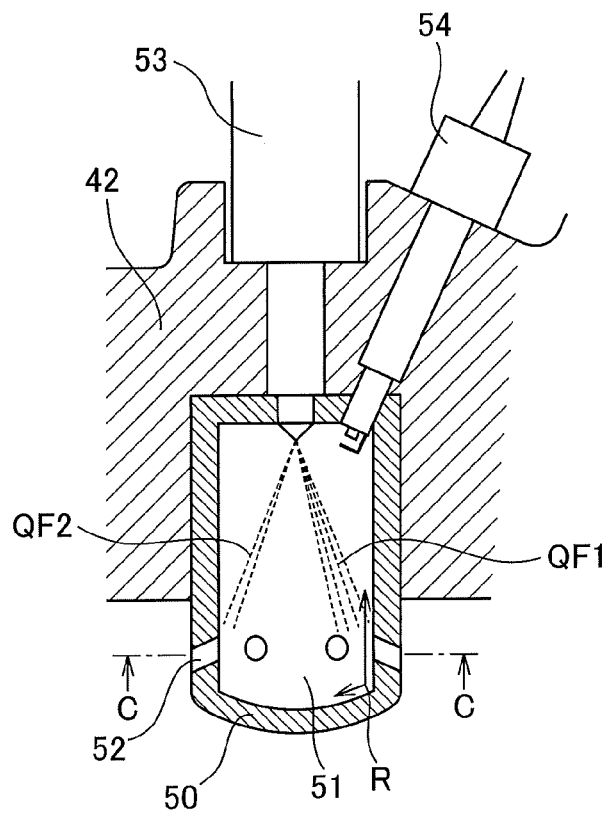
Figure 12B:
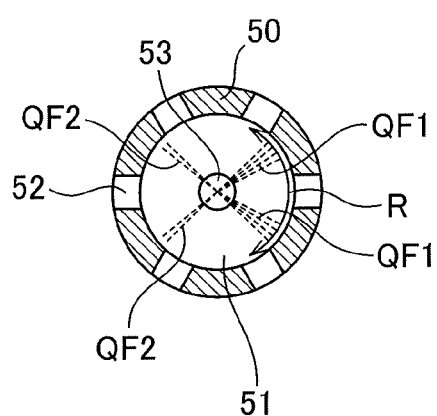
FIG. 12B is a cross-sectional view of an auxiliary chamber casing seen along the C-C cross-section of FIG. 12A.

FIGS. 12A and 12B show a modification of the present invention. In this modification, the auxiliary fuel QF1 is injected from the auxiliary fuel injector 53 toward the tumble flow inflow peripheral region R of the auxiliary chamber 51, and the auxiliary fuel QF2 is injected from the auxiliary fuel injector 53 toward the peripheral region of the auxiliary chamber 51 positioned at the opposite side to the tumble flow inflow peripheral region R. In this case, the auxiliary fuel QF2 is considerably smaller in amount compared with the auxiliary fuel QF1. Therefore, in all of the auxiliary fuels QF1, QF2, the auxiliary fuel QF1 becomes maximum. Therefore, in this modification, it can be said that the ejection port where the injection amount becomes maximum among the ejection ports of the auxiliary fuel injector 53 is oriented toward the tumble flow inflow peripheral region R of the auxiliary chamber 51.

That is, in the embodiment of the present invention, the auxiliary chamber 51 communicating with the inside of the main combustion chamber 2 through the communicating holes 52 and having the spark plug 54 and the auxiliary fuel injector 53 is formed at the central portion of the top surface of the main combustion chamber 2, and the air-fuel mixture in the main combustion chamber 2 is burned by the jet flames ejected from the communicating holes 52 when making the air-fuel mixture in the auxiliary chamber 51 burn by the spark plug 54. The tumble flow control valve 48 able to control the flow path of the flow of intake air in the intake port 45 is provided to cause the generation of the tumble flow W swirling around an axis perpendicular to the cylinder axis in the main combustion chamber 2. The auxiliary chamber 51 is provided with a plurality of the communicating holes 52 radially extending from the peripheral part of the end portion of the auxiliary chamber 51, which end portion is located on the main combustion chamber 2 side, toward the peripheral part of the main combustion chamber 2 and opening inside the flow path of the tumble flow W. The injection ports of the auxiliary fuel injector 53 are oriented toward the tumble flow inflow peripheral region R which is located on the peripheral part of the end portion of the auxiliary chamber 51 at a place located on a side where the tumble flow W flows in from the communicating holes 52. The auxiliary fuel QF, QF1 is injected from the auxiliary fuel injector 53 toward the tumble flow inflow peripheral region R of the auxiliary chamber 51 when the tumble flow W is made to be generated in the main combustion chamber 2 by the tumble flow control valve 48.

In this case, in the embodiment of the present invention, as shown in FIG. 9A and FIG. 9B, all of the injection ports of the auxiliary fuel injector 53 are oriented to the tumble flow inflow peripheral region R of the auxiliary chamber 51. In the modification of the present invention, as shown in FIG. 12A and FIG. 12B, the ejection port with the maximum injection amount among the ejection ports of the auxiliary fuel injector 53 is oriented toward the tumble flow inflow peripheral region R of the auxiliary chamber 51.

As explained above, in the embodiment of the present invention, the fuel is injected from the auxiliary fuel injector 53 when the tumble flow W is being generated, that is, when the tumble flow control valve 48 is made to close. When the tumble flow control valve is made wide open, the fuel injection from the auxiliary fuel injector 53 is stopped. On the other hand, as shown in FIG. 6, in the embodiment of the present invention, at the time of engine high load, high speed operation, the tumble flow control valve 48 is made to open, while at the time of engine low load, low speed operation, the tumble flow control valve 48 is made to close. Accordingly, in the embodiment of the present invention, at the time of engine high load, high speed operation, the injection of fuel from the auxiliary fuel injector 53 is stopped while at the time of engine low load, low speed operation, the injection of fuel from the auxiliary fuel injector 53 is performed.

Figure 13:
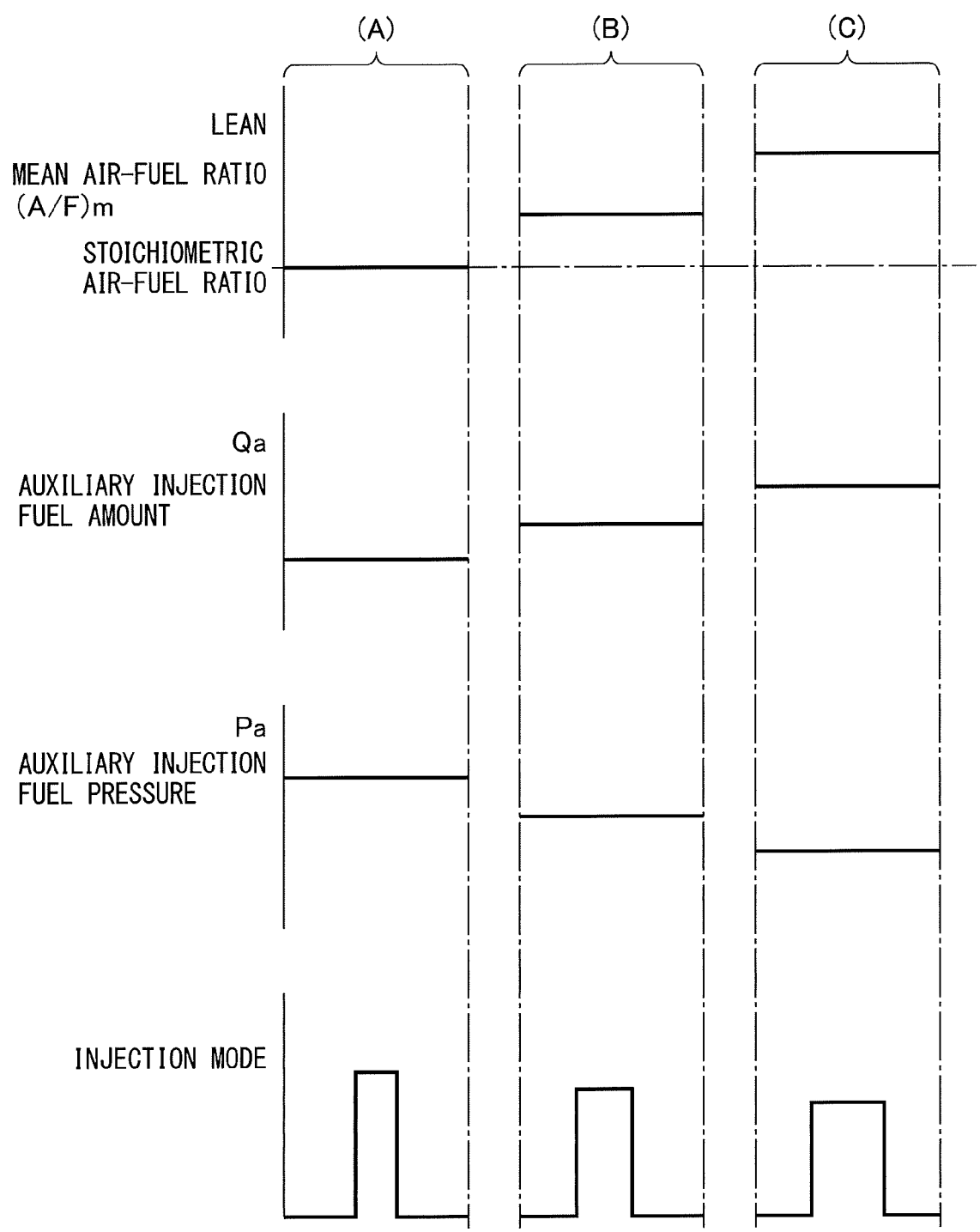
FIG. 13 is a view showing a mean air-fuel ratio of the inside of a main combustion chamber and the inside of an auxiliary chamber, an auxiliary fuel injection amount, an auxiliary fuel injection pressure, and an injection mode of auxiliary fuel.

On the other hand, as explained above, at the time of engine low load, low speed operation where the tumble flow control valve 48 is closed, the mean air-fuel ratio of the inside of the main combustion chamber 2 and the inside of the auxiliary chamber 51 is made the stoichiometric air-fuel ratio or lean air-fuel ratio. FIG. 13 shows the auxiliary fuel injection amount Qa, the auxiliary fuel injection pressure Pa, and the mode of injection of auxiliary fuel in the case (A) where the mean air-fuel ratio (A/F)m is made the stoichiometric air-fuel ratio, the case (B) where the mean air-fuel ratio (A/F)m is made a lean air-fuel ratio, and the case (C) where the mean air-fuel ratio (A/F)m is made a leaner air-fuel ratio than the case (B) at the time of engine low load, low speed operation where the tumble flow control valve 48 is closed.

In this regard, to secure good combustion in the auxiliary chamber 51, the density of the air-fuel mixture in the auxiliary chamber 51 has to be maintained at a certain density or more. Therefore, as shown in FIG. 13, the greater the mean air-fuel ratio (A/F)m becomes, the more the auxiliary fuel injection amount Qa is increased. In this regard, however, if the auxiliary fuel injection amount Qa is increased in this way, the density of the air-fuel mixture around the tumble flow inflow peripheral region R of the auxiliary chamber 51 becomes considerably higher and the disturbance caused in the air-fuel mixture becomes considerably greater. As a result, the combustion around the tumble flow inflow peripheral region R of the auxiliary chamber 51 becomes more active, so the jet flames ejected to the intake valve 44 side become too strong compared with other jet flames.

Therefore, to prevent the combustion around the tumble flow inflow peripheral region R of the auxiliary chamber 51 from becoming extremely active when the auxiliary fuel injection amount Qa is increased, when the auxiliary fuel injection amount Qa is increased, as shown in FIG. 13, the auxiliary fuel injection pressure Pa is made to fall and the injection time period of the auxiliary fuel is made longer. That is, in the embodiment of the present invention, when the tumble flow W is generated in the main combustion chamber 2 by the tumble flow control valve 48, the larger the mean air-fuel ratio in the main combustion chamber 2 and the auxiliary chamber 51 is made, the more the injection amount Qa of the auxiliary fuel is increased and the more the injection pressure Pa of the auxiliary fuel is made to fall. By doing this, no matter what the air-fuel ratio the mean air-fuel ratio (A/F)m is, it is possible to make the jet flames be ejected from the communicating holes 52 by a uniform intensity.

Figure 14:
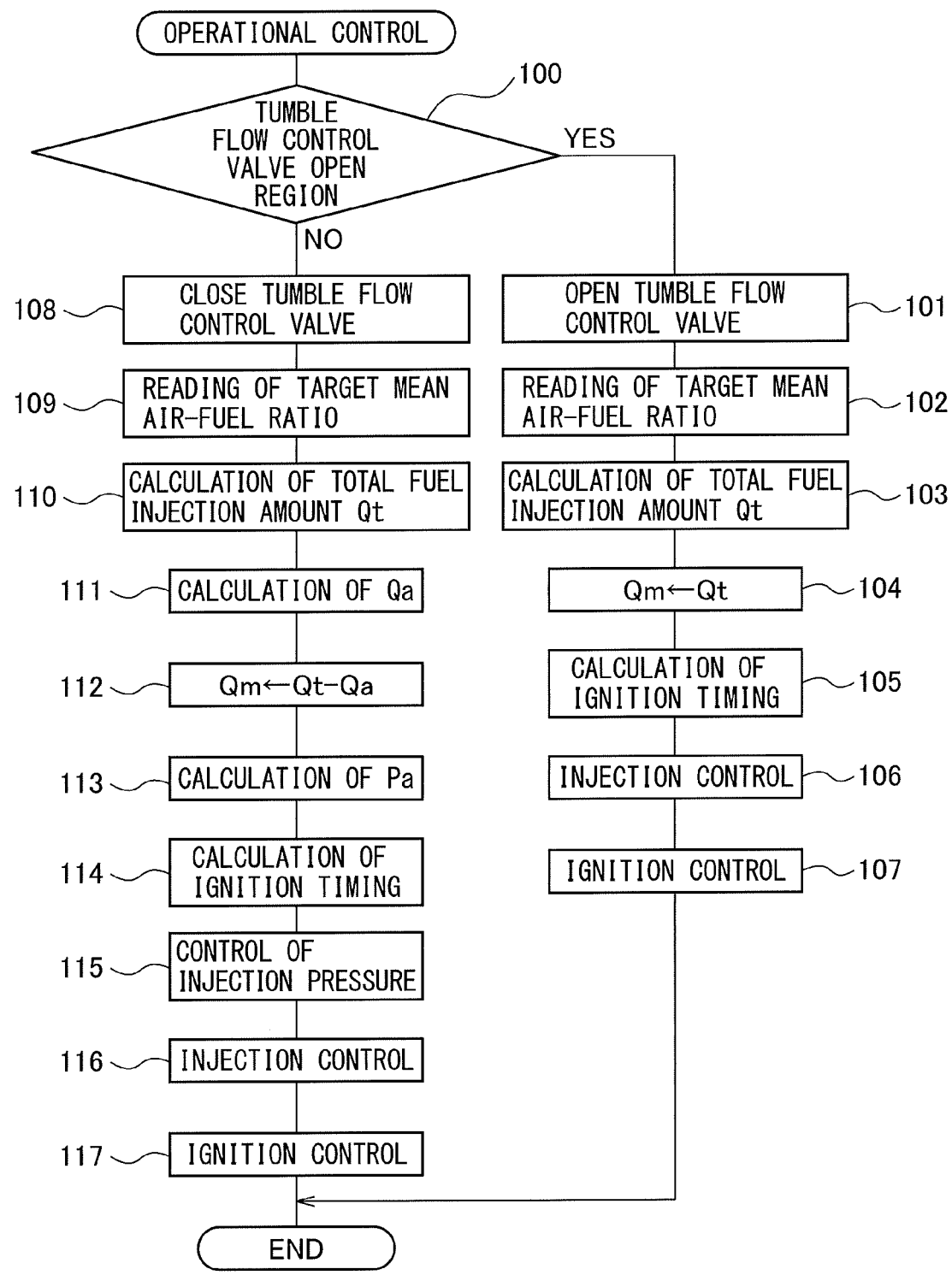
FIG. 14 is a flow chart for operational control of an engine.

FIG. 14 shows an operational control routine of an engine. This routine is executed by interruption every constant time period. Referring to FIG. 14, first, at step 100, it is judged if the operating state of the engine is in the open region of the tumble flow control valve 48 shown in FIG. 6. When the operating state of the engine is in the open region of the tumble flow control valve 48 shown in FIG. 6, the routine proceeds to step 101 where the tumble flow control valve 48 is made wide open. Next, at step 102, the target mean air-fuel ratio stored in advance in the ROM 23 of the electronic control unit 20 is read. This target mean air-fuel ratio is the stoichiometric air-fuel ratio or the rich air-fuel ratio. Next, at step 103, the total fuel injection amount Qt is calculated from this target mean air-fuel ratio and the intake air amount detected by the intake air amount detector 9.

Next, at step 104, the total fuel injection amount Qt is made the main fuel injection amount Qm from the main fuel injector 3. Next, at step 105, the ignition timing corresponding to the operating state of the engine is calculated based on the basic ignition timing stored in advance in the ROM 23 of the electronic control unit 20. Next, at step 106, injection control of the main fuel from the main fuel injector 3 is performed. Next, at step 107, ignition control by the spark plug 54 is performed.

On the other hand, when, at step 100, it is judged that the operating state of the engine is not in the open region of the tumble flow control valve 48 shown in FIG. 6, the routine proceeds to step 108 where the tumble flow control valve 48 is made to close such as shown by the solid line in FIG. 3. Next, at step 109, the target mean air-fuel ratio stored in advance in the ROM 23 of the electronic control unit 20 is read. This target mean air-fuel ratio is the stoichiometric air-fuel ratio or a lean air-fuel ratio. Next, at step 110, the total fuel injection amount Qt is calculated from this target mean air-fuel ratio and the amount of intake air detected by the intake air amount detector 9. Next, at step 111, the auxiliary fuel injection amount Qa is calculated based on the basic auxiliary fuel injection amount stored in advance in the ROM 23 of the electronic control unit 20.

Next, at step 112, the auxiliary fuel injection amount Qa is subtracted from the total fuel injection amount Qt, whereby the main fuel injection amount Qm is calculated. Next, at step 113, the auxiliary fuel injection pressure Pa is calculated based on the basic auxiliary fuel injection pressure stored in advance in the ROM 23 of the electronic control unit 20. Next, at step 114, the ignition timing corresponding to the operating state of the engine is calculated based on the basic ignition timing stored in advance in the ROM 23 of the electronic control unit 20. Next, at step 115, drive control of the fuel pump 56 is performed so that the fuel pressure detected by the fuel pressure sensor 57 becomes the auxiliary fuel injection pressure Pa. Next, at step 116, injection control for injecting the main fuel from the main fuel injector 3 with the main fuel injection amount Qm and injecting the auxiliary fuel from the auxiliary fuel injector 53 with the auxiliary fuel injection amount Qa is performed. Next, at step 117, ignition control by the spark plug 54 is performed.

The invention claimed is:

1. A control device of an internal combustion engine comprising:
   a main combustion chamber;
   an auxiliary chamber formed at a central portion of a top surface of the main combustion chamber and communicating with the inside of the main combustion chamber through communicating holes, said auxiliary chamber including a spark plug and an auxiliary fuel injector that injects a liquid fuel, an air-fuel mixture in the main combustion chamber being burned by jet flames ejected from the communicating holes when making an air-fuel mixture in the auxiliary chamber burn by the spark plug;
   a tumble flow control valve to control a flow path of a flow of intake air in an intake port so as to cause the generation of a tumble flow swirling around an axis perpendicular to a cylinder axis in the main combustion chamber; and
   an electronic control unit configured to control the spark plug, the auxiliary fuel injector, and the tumble flow control valve, wherein
   said auxiliary chamber being provided with a plurality of the communicating holes radially extending from a peripheral part of an end portion of the auxiliary chamber, which end portion is located on the main combustion chamber side, toward a peripheral part of the main combustion chamber and opening inside a flow path of the tumble flow,
   injection ports of the auxiliary fuel injector are oriented toward a tumble flow inflow peripheral region which is located on said peripheral part of the end portion of the auxiliary chamber at a place located on a side where the tumble flow flows in from the communicating holes, and
   the electronic control unit controls the auxiliary fuel injector to inject auxiliary fuel toward the tumble flow inflow peripheral region of the auxiliary chamber when the tumble flow is controlled to be generated in the main combustion chamber by the tumble flow control valve and controls the auxiliary fuel injector to stop injecting the auxiliary fuel when the generation of the tumble flow is stopped by the tumble flow control valve.

2. The control device of an internal combustion engine according to claim 1, wherein all of injection ports of the auxiliary fuel injector are oriented toward said tumble flow inflow peripheral region of the auxiliary chamber.

3. The control device of an internal combustion engine according to claim 1, wherein an injection port with a maximum injection amount among injection ports of the auxiliary fuel injector is oriented toward said tumble flow inflow peripheral region of the auxiliary chamber.

4. The control device of an internal combustion engine according to claim 1, wherein when the electronic control unit controls the tumble flow control valve to be wide open, injection of fuel from the auxiliary fuel injector is stopped.

5. The control device of an internal combustion engine according to claim 1, wherein when the electronic control unit controls the tumble flow control valve to generate the tumble flow, an injection amount of the auxiliary fuel is increased and an injection pressure of the auxiliary fuel is controlled to fall the larger a mean air-fuel ratio in the main combustion chamber and the auxiliary chamber is made.

* * * * *